(12) United States Patent
Ichinoo et al.

(10) Patent No.: US 12,711,619 B2
(45) Date of Patent: Aug. 18, 2026

(54) METHOD FOR CLASSIFYING CELLS USING CELL AUTOFLUORESCENCE IMAGE, AND ANALYSIS DEVICE

(71) Applicants: CANON KABUSHIKI KAISHA, Tokyo (JP); CANON MEDICAL SYSTEMS CORPORATION, Otawara (JP)

(72) Inventors: Takushi Ichinoo, Tokyo (JP); Ichiro Harada, Kanagawa (JP); Tsutomu Honma, Tokyo (JP); Yoshikatsu Ichimura, Tokyo (JP); Shuhei Toba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 263 days.

(21) Appl. No.: 18/427,487

(22) Filed: Jan. 30, 2024

(65) Prior Publication Data

US 2024/0169530 A1 May 23, 2024

Related U.S. Application Data

(63) Continuation of application No. PCT/JP2022/028624, filed on Jul. 25, 2022.

(30) Foreign Application Priority Data

Jul. 30, 2021 (JP) ................................ 2021-126090

(51) Int. Cl.
*G06T 7/11* (2017.01)
*G06T 7/00* (2017.01)
*G06T 7/90* (2017.01)

(52) U.S. Cl.
CPC .............. *G06T 7/0012* (2013.01); *G06T 7/11* (2017.01); *G06T 7/90* (2017.01); *G06T 2207/10024* (2013.01); *G06T 2207/30024* (2013.01)

(58) Field of Classification Search
CPC ......... G06T 7/0012; G06T 2207/30024; G06T 7/11; G06T 7/90; G06T 2207/10024; G01N 21/64
See application file for complete search history.

(56) References Cited

U.S. PATENT DOCUMENTS

2020/0367818 A1* 11/2020 DaCosta ................ A61B 90/30
2021/0190669 A1* 6/2021 Ota .................... G01N 15/1459
(Continued)

FOREIGN PATENT DOCUMENTS

JP 2006508358 A 3/2006
JP 2019012084 A 1/2019
(Continued)

OTHER PUBLICATIONS

Wang et al. "Classifying T cell activity in autofluorescence intensity images with convolutional neural networks"; Journal of biophotonics 13.3: e201960050 (Year: 2020).*
(Continued)

*Primary Examiner* — Sumati Lefkowitz
*Assistant Examiner* — Michael Adam Shariff
(74) *Attorney, Agent, or Firm* — Canon U.S.A., Inc. IP Division

(57) ABSTRACT

Provided is a method that addresses a problem of classifying cells through use of cell autofluorescence, the method including the steps of: acquiring autofluorescence information regarding a plurality of cells through use of an autofluorescence image regarding the plurality of cells; acquiring region information; extracting the autofluorescence information on individual cells from the autofluorescence information regarding the plurality of cells and the region information; and classifying the plurality of cells into two or more groups by performing clustering through use of the autofluorescence information on the individual cells.

21 Claims, 14 Drawing Sheets

(56) References Cited

U.S. PATENT DOCUMENTS

2022/0175969 A1* 6/2022 Dyka .................... A61P 27/00
2023/0143102 A1* 5/2023 Anwar ................ A61B 1/0684
382/128

FOREIGN PATENT DOCUMENTS

WO 2013146843 A1 10/2013
WO 2017191699 A1 11/2017

OTHER PUBLICATIONS

Bianchetti et al. "Label-free metabolic clustering through unsupervised pixel classification of multiparametric fluorescent images"; Analytica Chimica Acta 1148: 238173 (Year: 2021).*

Hasegawa, K., et al., "Visualizing of mitochondrial redox state in heart by the ratio of FAD/NADH fluorescence intensity", Society of Japan, 2010, vol. 30, No. 11, p. 73-79.

Skala, M.C., et al., "In vivo multiphoton microscopy of NADH and FAC redox states, fluorescence lifetimes, and cellular morphology in precancerous epithelia", Department of Biomedical Engineering, Duke University and Laboratory for Optical and Computational Instrumentation, Research Animal Resources Center, and Department of Biostatistics, University of Wisconsin, PNAS, Dec. 4, 2007, vol. 104, No. 49, p. 19494-19499.

Veld, D., et al., "Autofluorescence spectroscopy for the classification of oral lesions", "Autofluorescence and Raman microspectroscopy of tissue sections of oral lesions", University of Groningen, 2005, p. 82-93.

Zijie J. Wang et al., Classifying T cell activity in autofluorescence intensity images with convolutional neural networks, Journal of Biophotonics.

Gigada Bianchetti et al., Label-free metabolic clustering through unsupervised pixel classification of multiparametric fluorescent images.

* cited by examiner

METHOD FOR CLASSIFYING CELLS USING CELL AUTOFLUORESCENCE IMAGE, AND ANALYSIS DEVICE

CROSS-REFERENCE TO RELATED APPLICATIONS

This application is a Continuation of International Patent Application No. PCT/JP2022/028624, filed Jul. 25, 2022, which claims the benefit of Japanese Patent Application No. 2021-126090, filed Jul. 30, 2021, both of which are hereby incorporated by reference herein in their entirety.

BACKGROUND OF THE INVENTION

Field of the Invention

The present invention relates to a method of classifying cells through use of an image of cell autofluorescence and to a cell analysis apparatus.

Description of the Related Art

Some cell endogenous components are known to emit fluorescence. A plurality of coenzymes among coenzymes relating to a reduced state or a metabolic state in a cell emit fluorescence. In particular, Hasegawa et al. focused on coenzymes NADH and FAD each having fluorescence brightness that rises and falls due to a redox state of a living tissue. Then, Hasegawa et al. developed a system for calculating a brightness ratio between respective fluorescence wavelengths corresponding to NADH and FAD in a photographed image of an organ, and determining the redox state of a living tissue (K. Hasegawa, Y. Ogasawara, Transactions of the Visualization Society of Japan, 2010, 30, 11, 73-79).

A fluorescence lifetime imaging microscopy in which a high-resolution microscope and a femtosecond laser are combined has been developed. Through use of the fluorescence lifetime imaging microscopy, a change in an autofluorescence wavelength component in a process in which a usual cell becomes cancerous has been measured from a quantification of an absolute value of NADH or FAD in each individual cell (M. C. Skala, K. M. Riching, A. Gendron-Fitzpatrick, J. Eickhoff, K. W. Eliceiri, J. G. White, and N. Ramanujam, PNAS, 2007, 104, 49, 19,494-19,499).

In addition, there has been developed means for analyzing information on an unknown sample by acquiring autofluorescence, shape, and motion information on bacteria or the like from an image on a cell-by-cell basis and learning features with data thereon being used as a teacher through machine learning Japanese Patent Application Laid-Open No. 2019-012084). Further, there has been developed a method of classifying cells by performing spatial distribution measurement on fluorescence brightness in the cells from a high-resolution image for a fluorescence image of a stained sample (International Publication No. WO2013/146843).

Meanwhile, in general, even for allogeneic cells, an absolute amount of a coenzyme serving as a chromogenic factor for autofluorescence is indeterminate, and brightness of the autofluorescence and spectral information thereon differ depending on, for example, a culture environment, a method, or a difference between individuals or organs from which the cells are derived. This inhibits a phenotype or a state of each of cells from being determined based on, for example, an absolute amount of the brightness of a specific wavelength of the autofluorescence of each individual cell or an arithmetic operation of the brightness of each wavelength. Thus, in order to identify or estimate a cell type or the state of a cell, it has been required to, for example, prepare a control experiment or calibration data for showing a correlation between the phenotype of the cell and the autofluorescence brightness, or accumulate teacher data as in WO2013/146843.

In microscopic imaging, a difference between cells observed in a field of view can be examined, but concurrent global information cannot be obtained. Thus, it is difficult to classify, by the phenotype, a large number of cell types included in a wide-area (for example, several centimeters square) tissue or in a culture Petri dish. In the method of Japanese Patent Application Laid-Open No. 2019-012084, global information is acquired, but a change or a difference in the entire tissue is only examined, and information on each individual cell cannot be acquired, thereby inhibiting the cell types from being classified by the phenotype. With the method of Japanese Patent Application Laid-Open No. 2019-012084, it is not possible to examine whether a cause of the brightness change at each of various wavelengths of the autofluorescence is, for example, a change in the number of cells or a change in the brightness of each individual cell.

SUMMARY OF THE INVENTION

The present invention has an object to classify cells through use of autofluorescence information on a plurality of cells.

The inventors of the present invention have found that, regarding a plurality of cells, the plurality of cells can be classified into two or more groups by performing clustering through use of autofluorescence information on those individual cells.

That is, according to the present invention, there is provided a method including the steps of: acquiring autofluorescence information regarding a plurality of cells through use of an autofluorescence image regarding the plurality of cells; acquiring region information indicating a region of each individual cell in the autofluorescence image; extracting the autofluorescence information on the individual cells from the autofluorescence information regarding the plurality of cells and the region information; and classifying the plurality of cells into two or more groups by performing clustering through use of the autofluorescence information on the individual cells.

Further features of the present invention will become apparent from the following description of exemplary embodiments with reference to the attached drawings.

DESCRIPTION OF THE EMBODIMENTS

Figure 1:
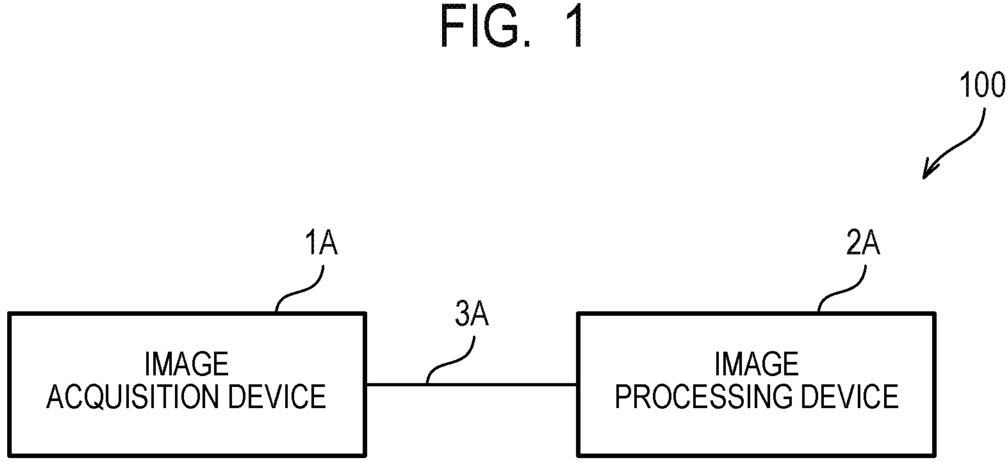
FIG. 1 is a diagram for illustrating an example of an analysis apparatus according to an embodiment.

Specific configuration examples of the present invention are described below, but the present invention is not limited to a method described below.

First Embodiment

As a first embodiment of the present invention, there is provided a method including the steps of: acquiring autofluorescence information regarding a plurality of cells through use of an autofluorescence image regarding the plurality of cells; acquiring region information indicating a region of each individual cell in the autofluorescence image; extracting the autofluorescence information on the individual cells from the autofluorescence information regarding the plurality of cells and the region information; and classifying the plurality of cells into two or more groups by performing clustering through use of the autofluorescence information on the individual cells.

In this manner, according to this embodiment, a plurality of cells are classified by performing the clustering, and hence teacher data is not required. In addition, the use of the autofluorescence image eliminates requirement of staining and enables the cells to be classified in a non-invasive manner. Details thereof are described below.

(Cell)

Any cell can be used in the method according to this embodiment, but it is preferred to use a mammalian cell. Examples of the cell serving as a subject include a cultured cell, a cell in a tissue section, a tissue, and a cell extracted from a biological sample. A normal cell, a cancer cell, a mixed culture or mixed tissue of a cancer cell and a normal cell, of cancer cells, or of normal cells, or the like is used as the subject. Further, a cell in which presence or absence of a trait of allogeneic cells due to epithelial-mesenchymal transition of a cancer cell, induction of differentiation from an undifferentiated cell, senescence of the cell, or the like is to be predicted is used as the subject.

In the method according to this embodiment, from cells, an autofluorescence image is acquired or an autofluorescence image and an image for region extraction are acquired. Those images are each acquired by picking up an image of the cells by an image acquisition device such as a camera through an optical system including a magnifying lens such as a microscope.

The cells may be in any state as long as the image of the cells can be picked up by the image acquisition device. For example, when the image acquisition device is a general microscope, the cells can be in a suspended, adhered, or cultured state in a Petri dish, a plate, a flask, or the like, or may be included in a section. As long as the image can be picked up, the cells may be those present in a living body, such as those in blood or a tissue.

The method according to this embodiment has a feature of being applicable to a cell that is living, but the subject is not limited to the living cell, and for example, the cell may be an immobilized cell or a cell included in an immobilized section.

(Autofluorescence Image)

The autofluorescence refers to fluorescence emitted by a substance inherent in a cell or a tissue when being irradiated with an excitation wavelength. In particular, examples of an endogenous component that emits autofluorescence include autofluorescent molecules produced in a cell, such as NAD(P)H, flavins (FAD and the like), collagen, fibronectin, tryptophan, and folic acid.

In the method according to this embodiment, it is not required to identify what endogenous component is emitting autofluorescence, and the autofluorescence also includes fluorescence emitted by an endogenous component other than the fluorescent endogenous components exemplified above.

One or more autofluorescence images may be acquired for one sample containing a plurality of cells. The autofluorescence image is obtained from fluorescence emitted through irradiation with excitation light having a specific wavelength. The excitation light may be light having one wavelength, or may be light formed of light having a plurality of wavelengths. Further, the fluorescence may be light having one wavelength, or light formed of light having a plurality of wavelengths may be used as the fluorescence.

As an example of the irradiation with the excitation light, there is irradiation performed through a short-pass filter that cuts off a fluorescence wavelength region or more to be measured, through use of a white light source such as a mercury lamp or a xenon lamp that emits a wavelength of 350 nm or more. Further, as another example, there is irradiation through a short-pass filter that cuts off a fluorescence wavelength region or more to be measured, through use of, as a light source, an LED that emits a specific region wavelength having a center wavelength. However, the present invention is not limited thereto.

In regard to wavelengths at the time of image pickup of an autofluorescence image, there is used 365-nm excitation/430-nm long-pass filter observation, 365-nm excitation/530-nm long-pass filter observation, 395-nm excitation/430-nm long-pass filter observation, 395-nm excitation/530-nm long-pass filter observation, or 450-nm excitation/530-nm long-pass filter observation, but the present invention is not limited thereto.

(Autofluorescence Information)

Autofluorescence information regarding a plurality of cells may be acquired from an autofluorescence image regarding to the plurality of cells. The autofluorescence information includes brightness of autofluorescence, and may further include position information, area information, and other information on the brightness. The brightness is not particularly limited as long as a value thereof represents a fluorescence intensity, and any index may be used therefor. The brightness may be referred to also as "intensity."

The brightness is expressed on color space coordinates, and may have a value obtained from those coordinates. An RGB color space may be used as an example of the color space. The brightness may have a value calculated as an index of at least any one of R, G, or B in the RGB color space. Further, the brightness may have a value calculated as an index in a Lab color space, an HSV color space, or an HLS color space. Brightness information may be described through use of a color space other than those described above.

In the present specification, in the color space, R may be any wavelength in a range of 600 nm or more and 800 nm or less, G may be any wavelength in a range of 500 nm or more and less than 600 nm, and B may be any wavelength in a range of 350 nm or more and less than 500 nm.

Autofluorescence information on each individual cell is extracted from the autofluorescence information regarding the plurality of cells and region information indicating a region of each individual cell.

As the autofluorescence information on each individual cell, one or more pieces of autofluorescence information are preferred to be determined per cell, and typically one piece of autofluorescence information is determined per cell.

The brightness of the autofluorescence of each individual cell can be used as the autofluorescence information on each individual cell. In addition, a representative value of the brightness of a relevant cell can be used as the autofluorescence information on that cell. As the representative value, a minimum value, a maximum value, an average value, a median value, or the like may be used.

For example, acquiring the autofluorescence information with R in the color space being used as the index means acquiring a value of the brightness for any wavelength in the range of 600 nm or more and 800 nm or less for each individual cell in the autofluorescence image. In order to classify a plurality of cells into two or more groups, it is required to plot values of brightness relating to at least one index among R, G, and B to perform clustering.

(Region Information)

The region information is information indicating the region of each individual cell in the autofluorescence image. The region information on the cells is required in order to associate pieces of autofluorescence information regarding a plurality of cells to the respective cells. The region information includes information on at least any one of a position, size, area, shape, or thickness of a cell or a distribution of cells.

When the region information is information on the position of a cell, the position may be identified in any manner as long as the autofluorescence image can be associated with each cell, and may be identified by, for example, a position on a field of view of the microscope or a position on a sample such as a culture dish or a tissue.

The region information can be acquired through use of the autofluorescence image. That is, the position, size, area, shape, or thickness of each individual cell, the distribution of cells, or the like can be known from the autofluorescence image, and through use thereof, it is possible to know the region of each individual cell.

In another case, the region information may be acquired from the image for region extraction described later.

The region information may be, for example, information on a mask image to be used in overlay with the autofluorescence image or the autofluorescence information, the mask image being generated from the image for region extraction or the autofluorescence image.

The mask image functions to extract information corresponding to the individual cells from the autofluorescence information and to mask the rest.

A specific example is described next. It is possible to binarize the image for region extraction and use cell position information as an image mask. The image mask can be superimposed on the autofluorescence images expressed as respective pieces of RGB color information in advance to obtain RGB values of each individual cell.

In the foregoing, the image mask is an example of the region information, the autofluorescence images expressed as the respective pieces of RGB color information are an example of the autofluorescence information regarding a plurality of cells, and the RGB values of each individual cell is an example of the autofluorescence information on each individual cell.

(Image for Region Extraction)

The image for region extraction is an image to be acquired separately from the autofluorescence image in order to obtain the region information on each individual cell in the autofluorescence image, and may be an image that enables identification of each individual cell itself, a cell membrane, a nucleus, and other intracellular organelles. The image for region extraction may be a bright-field image, or may be acquired as, for example, a bright-field image or a fluorescence image obtained after specific intracellular organelles, examples of which include nuclei, have been stained. However, when the image for region extraction is a fluorescence image, the excitation wavelength or fluorescence wavelength thereof is preferred to be selected so as not to overlap with those wavelengths of the autofluorescence. One or more images for region extraction may be acquired for one sample.

The image for region extraction may be a bright-field image obtained through magnification, imaging, and photographing in a bright field. In another case, the image for region extraction may be a fluorescence photographed image of a stained sample or a non-stained sample.

(Third Information)

The method may include a step of acquiring third information separate from the autofluorescence information or the region information. The third information may be acquired from the bright-field image, may be acquired from the fluorescence image, or may be information acquired from other than images. Examples of the third information can include information on presence or absence of a specific marker in each cell and other information, and examples thereof can include an immunostained image in which a desired marker is specifically stained.

(Bright-Field Image)

The bright-field image may be used as the image for region extraction, or may be used for acquiring the third information. An example of a method of acquiring a bright-field image is as follows. That is, a light source having a visible light wavelength or a white light source that is a mixture of a plurality of light source wavelengths emits light in parallel to an optical axis of an objective lens or, even when the light is not parallel to the optical axis, emits light at an angle that is not perpendicular to the optical axis. Then, reflected light from a subject sample, diffracted light due to or birefringence, and interference therewith can be detected.

(Fluorescence Image)

A fluorescence image may be used as the autofluorescence image, the image for region extraction, or the third information. An example of a method of acquiring a fluorescence image is described next. A light source having a center wavelength of a specific wavelength from ultraviolet to visible light as a fluorescence excitation light source wavelength is caused to irradiate the sample in parallel to the optical axis of the objective lens or at least at an angle that is not perpendicular to the optical axis, to thereby excite the fluorescence of the sample. The fluorescence generated by the excitation is detected through a cut filter installed in front of or behind the objective lens or the like on an observation side of the objective lens or the like. As cut filters for excitation light and fluorescence observation, cut filters for both wavelengths are selected so that a part of the excitation light source wavelength does not pass through a fluorescence cut filter on the observation side.

(Step of Classifying)

In a step of classifying in this embodiment, a plurality of cells are classified into two or more groups by performing clustering through use of the autofluorescence information on the individual cells. Results of the classification can be visualized so as to be easily perceived by a user. For example, the results can be visualized as a one-dimensional, two-dimensional, or three-dimensional graph having at least the brightness of the autofluorescence of each individual cell as one axis. The graph may be a one-dimensional graph having only the brightness of the autofluorescence as the axis. In another case, the graph may be a two-dimensional or three-dimensional graph having two or more kinds of brightness of the autofluorescence as the axes. Further, the graph may be a two-dimensional or three-dimensional graph in which the brightness of the autofluorescence is set as one axis and the region information or the third information other than the brightness of the autofluorescence is used as another axis. The graph enables a plurality of cells to be grouped into two or more groups through visual observation. Each axis of the graph can be said to be a kind of feature amount described later.

The graph refers to any form that can visualize numerical information. The graph is only required to enable information to be visualized, and can be exemplified by a histogram in a case of a one-dimensional form and a scatter diagram in a case of a two-dimensional or three-dimensional form, but the present invention is not limited thereto. Other examples of the graph to be used may include a probability density function plot for kernel density estimation or the like and a heat map.

In another case, in the step of classifying a plurality of cells into two or more groups through use of the autofluorescence information on the individual cells, the plurality of cells can be classified into two or more groups through unsupervised machine learning. Examples of the unsupervised machine learning include principal component analysis, the k-means method, and GMM.

In a case of machine learning, a feature amount is required. The feature amount is a digitized version of a feature of data. At least one example of the feature amount is the autofluorescence information on each individual cell, and more specifically, the brightness of the autofluorescence of each individual cell. Further, the region information or the third information other than the brightness of the autofluorescence can be used as the feature amount. When there are a plurality of pieces of autofluorescence information, the plurality of pieces of autofluorescence information may be used as further feature amounts.

(Association with Phenotype)

The two or more groups obtained through the classification can be associated with phenotypes of cells on a group-by-group basis. Examples of a combination of phenotypes with which the two or more groups are associated can include cancer cells and non-cancer cells, cancer cell groups having mutually different grades of malignancy, undifferentiated cells and differentiated cells, differentiated cells and dedifferentiated cells, and epithelial and mesenchymal cells of allogeneic cancer cells.

Thus, this embodiment can be used in, for example, discrimination of the grade of malignancy of cancer cells in a tissue or cultured cells or determination of a difference in differentiation in maintenance culture of undifferentiated cells of various stem cells, the induction of differentiation thereof, or the like.

(Acquisition of Quantitative Information)

In this embodiment, the method may include a step of acquiring quantitative information regarding the groups obtained through the classification by the step of classifying. In this case, examples of the quantitative information include the number of cells belonging to each group, a ratio of the number of cells between respective groups, a ratio of the brightness between at least two of R, G, and B in the color space, and a ratio of the representative value of the brightness between respective groups. In this case, the minimum value, the maximum value, the average value, the median value, or the like may be used as the representative value.

(Field of View, Number of Pixel, and Resolution)

The classification of cells is assumed to be applied to a large number of cells such as all cells on the culture dish or all cells included in a tissue. Meanwhile, in observation using a microscope which has hitherto been adopted, only a limited number of cells were able to be simultaneously observed within one field of view. In order to obtain collective information, it is preferred to use image pickup with a large number of pixels or a wide field of view. When the high-pixel with a large number of pixels or a large field of view is used, not only information can be obtained collectively, but also a large number of pieces of autofluorescence information for each individual cell can be obtained, thereby enabling more accurate classification.

From this point of view, an autofluorescence image regarding to a plurality of cells is preferred to be acquired by picking up an image of a region of 60 mm 2 or more capable of collective image pickup of a plurality of cells that are statistically sufficient to cause one field of view to represent an entire cell culture vessel.

When $1.2\times10^6$ cells that are said to be the number of cells at 35 mm dish in a confluent state are cultured with about 15,000 cells being present within one field of view, one Petri dish can be represented by one field of view with a statistically 1% tolerance and a 99% reliability level. Thus, as a field of view at the time of photographing, it is required to use, for example, a field of view of about 60 $mm^2$ that is a size obtained when 15,000 mammalian cells each having a cell size of 20 μm are spread all over. However, when it is determined that it is not required to reduce the tolerance to such a degree or maintain the reliability at such a degree, a smaller number of cells are sufficient, and hence the field of view may be lower than that.

Further, in order to collectively pick up an image of a plurality of cells in the above-mentioned region to acquire the autofluorescence image, it is required to individually recognize 15,000 cells. In order to satisfy this requirement, the autofluorescence image regarding the plurality of cells is preferred to have the number of pixels of at least 30,000 pixels or more and a resolution of 20 μm or less per pixel.

Second Embodiment

As a second embodiment of the present invention, there is provided an analysis apparatus including an image acquisition device and an image processing device, wherein the image acquisition device is configured to acquire an autofluorescence image regarding a plurality of cells, and wherein the image processing device is configured to: acquire autofluorescence information regarding the plurality of cells through use of the autofluorescence image; acquire region information indicating a region of each individual cell in the autofluorescence image; extract the autofluorescence information on the individual cells from the autofluorescence information regarding the plurality of cells and the region information; and classify the plurality of cells into two or more groups by performing clustering through use of the autofluorescence information on the individual cells.

The image processing device can acquire, based on an autofluorescence image regarding a plurality of cells, region information indicating regions of the individual cells. In another case, the image acquisition device can further acquire an image for region extraction regarding the plurality of cells. In that case, the image processing device can acquire region information indicating the regions of the individual cells through use of the image for region extraction regarding the plurality of cells.

(Apparatus Configuration)

FIG. 1 is an illustration of an example of an apparatus configuration of an analysis apparatus 100 according to this embodiment.

As illustrated in FIG. 1, the analysis apparatus 100 is formed by connecting an image acquisition device 1A and an image processing device 2A to each other through an interface such as a cable 3A so as to enable data transmission and reception therebetween. A connection method between the image acquisition device 1A and the image processing device 2A is not particularly limited. For example, the image acquisition device and the image processing device may be connected to each other by a local area network (LAN), or may be connected to each other in a wireless manner.

The image acquisition device 1A acquires an image of cells on a cell culture vessel, a tissue section on a slide glass, or the like that is placed on a placement stage, and transmits the image to the image processing device 2A.

Figure 2:
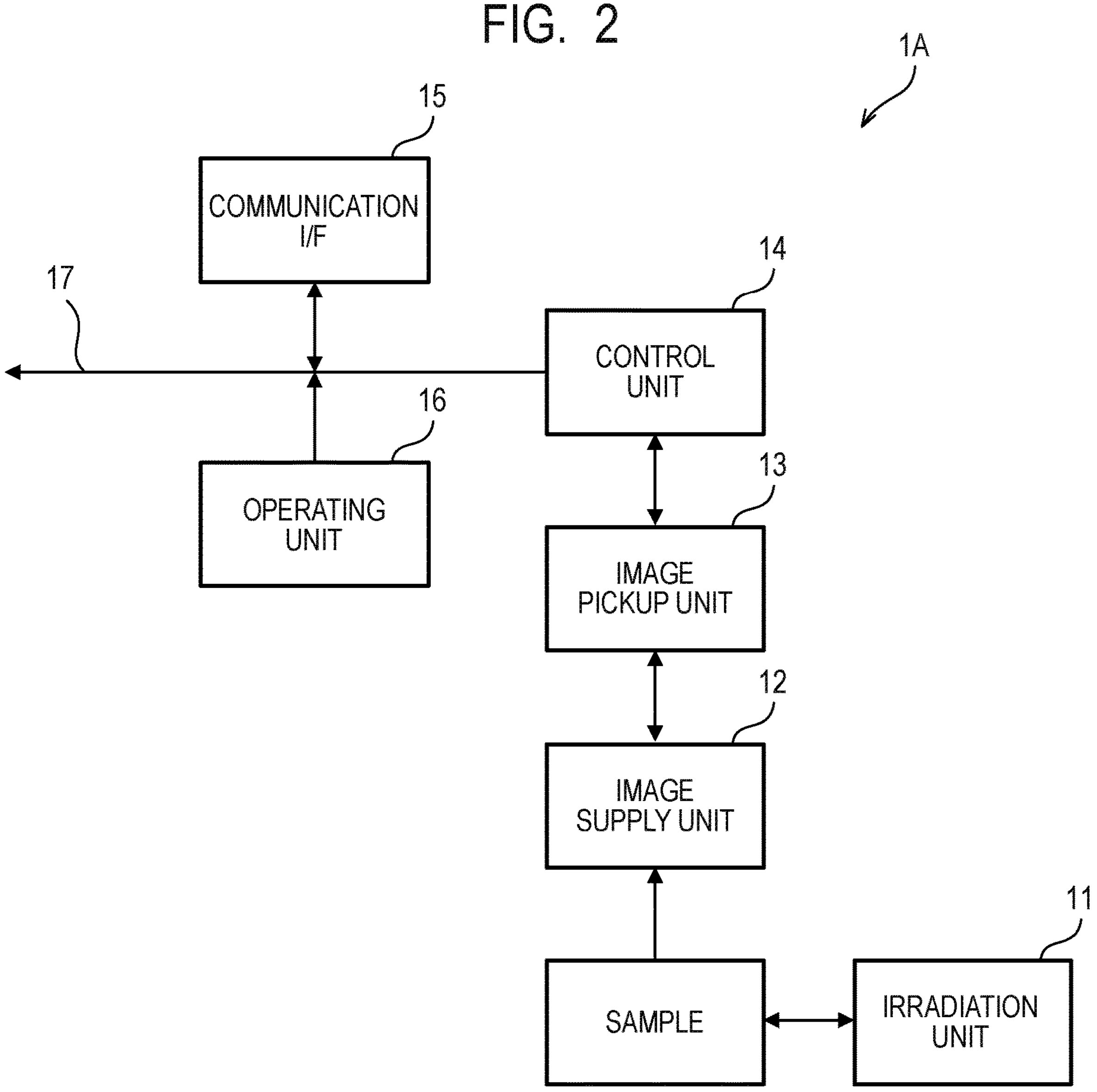
FIG. 2 is a diagram for illustrating an example of a functional configuration of an image acquisition device in this embodiment.

An example of the configuration of the image acquisition device 1A is illustrated in FIG. 2. The image acquisition device 1A includes an irradiation unit 11, an imaging unit 12, an image pickup unit 13, a control unit 14, a communication I/F 15, an operating unit 16, and the like. The irradiation unit 11 is formed of a light source filter or the like for fluorescence observation and a white light source for cell shape observation, and irradiates cultured cells or a tissue section placed on the placement stage or the like with light. The imaging unit 12 is formed of an eyepiece, an objective lens, a filter, and the like, and forms an image of transmitted light, reflected light, or fluorescence that is emitted from the cells on the cell culture vessel or the tissue section on the slide in accordance with the applied light. The image pickup unit 13 is a camera that includes, for example, a complementary MOS (CMOS) sensor, and picks up an image to be formed on an imaging surface by the imaging unit to generate digital image data (image data of R, G, and B) on the image. The control unit 14 includes a central processing unit (CPU), a random access memory (RAM), and the like. The control unit 14 executes various kinds of processing in cooperation with various programs installed therein. The communication I/F 15 transmits the generated image data on the image to the image processing device 2A. In this embodiment, the image acquisition device 1A can include a bright-field unit in which irradiation means and imaging means that are suitable for bright-field observation are combined, and a fluorescence unit in which irradiation means and imaging means that are suitable for fluorescence observation are combined. The bright field or the fluorescence can be switchable by switching the unit. The operating unit 16 includes a keyboard provided with character input keys, number input keys, various function keys, and the like and a pointing device such as a mouse, and outputs a pressing signal of a key pressed on the keyboard and an operation signal generated by the mouse to the control unit 14 as input signals.

The image processing device 2A uses the image transmitted from the image acquisition device 1A to classify a plurality of cells into two or more groups.

Figure 3:
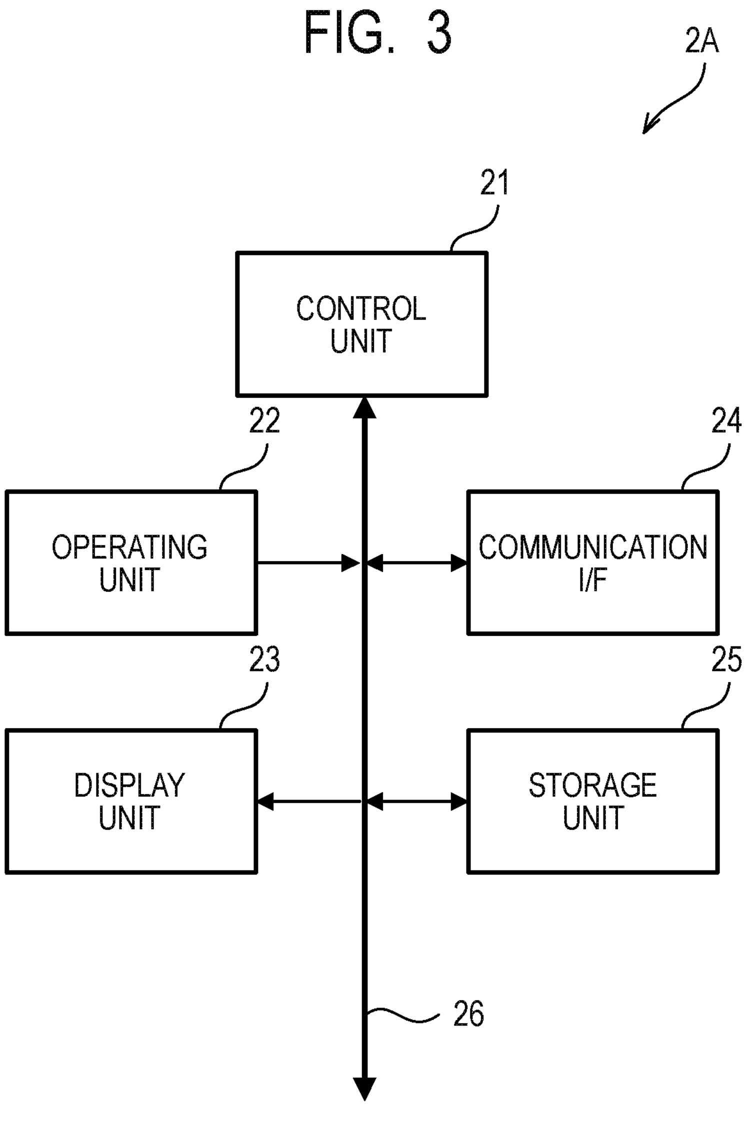
FIG. 3 is a diagram for illustrating an example of a functional configuration of an image processing device in this embodiment.

FIG. 3 is an illustration of an example of a configuration of the image processing device 2A. The image processing device 2A includes a control unit 21, an operating unit 22, a display unit 23, a communication I/F 24, a storage unit 25, and the like, and the respective units are connected through a bus 26.

The control unit 21 includes a CPU and the like. Various kinds of processing are executed in cooperation with various programs stored in the storage unit 25, and operations of the image processing device are centrally controlled. For example, the control unit 21 executes image processing in cooperation with a program stored in the storage unit 25. The control unit analyzes the image transmitted from the image acquisition device 1A. The control unit extracts the autofluorescence information on the individual cells from the region information and the autofluorescence information regarding the plurality of cells. Then, the autofluorescence information is used to classify the plurality of cells into two or more groups. However, a human may intervene in an intermediate step, in particular, in the classification.

The operating unit 22 includes a keyboard provided with character input keys, number input keys, various function keys, and the like and a pointing device such as a mouse, and outputs a pressing signal of a key pressed on the keyboard and an operation signal generated by the mouse to the control unit 21 as input signals.

The display unit 23 includes, for example, a monitor such as a cathode ray tube (CRT) or a liquid crystal display (LCD), and displays various screens in accordance with an instruction of a display signal input from the control unit 21. In this embodiment, the display unit 23 functions as means for displaying, for example, a calculated feature amount, a graph based on the feature amount, results of classification, or phenotypes associated with groups obtained through the classification.

The communication I/F 24 is an interface for transmitting and receiving data to and from an external device such as the image acquisition device 1A. The communication I/F 24 functions as input means for a bright-field image and a fluorescence image. In this embodiment, the communication I/F 24 functions as input means.

The storage unit 25 is formed of, for example, a hard disk drive (HDD) or a semiconductor-based nonvolatile memory. The storage unit 25 stores various programs, various kinds of data, and the like as described above. For example, the storage unit 25 stores various kinds of data such as a magnification table to be used in image analysis processing described later.

In addition, the image processing device 2A may include a LAN adapter, a router, and the like and may be configured to be connected to an external device through a communication network such as a LAN.

The image processing device 2A in this embodiment performs analysis through use of the autofluorescence image and, as required, the image for region extraction that have been transmitted from the image acquisition device 1A.

The autofluorescence image is an image obtained by irradiating a plurality of cells serving as subjects with excitation light having a predetermined wavelength in the image acquisition device 1A to cause a fluorescent substance to be emitted and subjecting the fluorescence to magnification, imaging, and photographing through a cut filter for a wavelength equal to or more than a light source wavelength. The fluorescence appearing in the autofluorescence image indicates an expression and a state of a specific biological substance corresponding to a metabolic state or the like in each cell.

Figure 4:
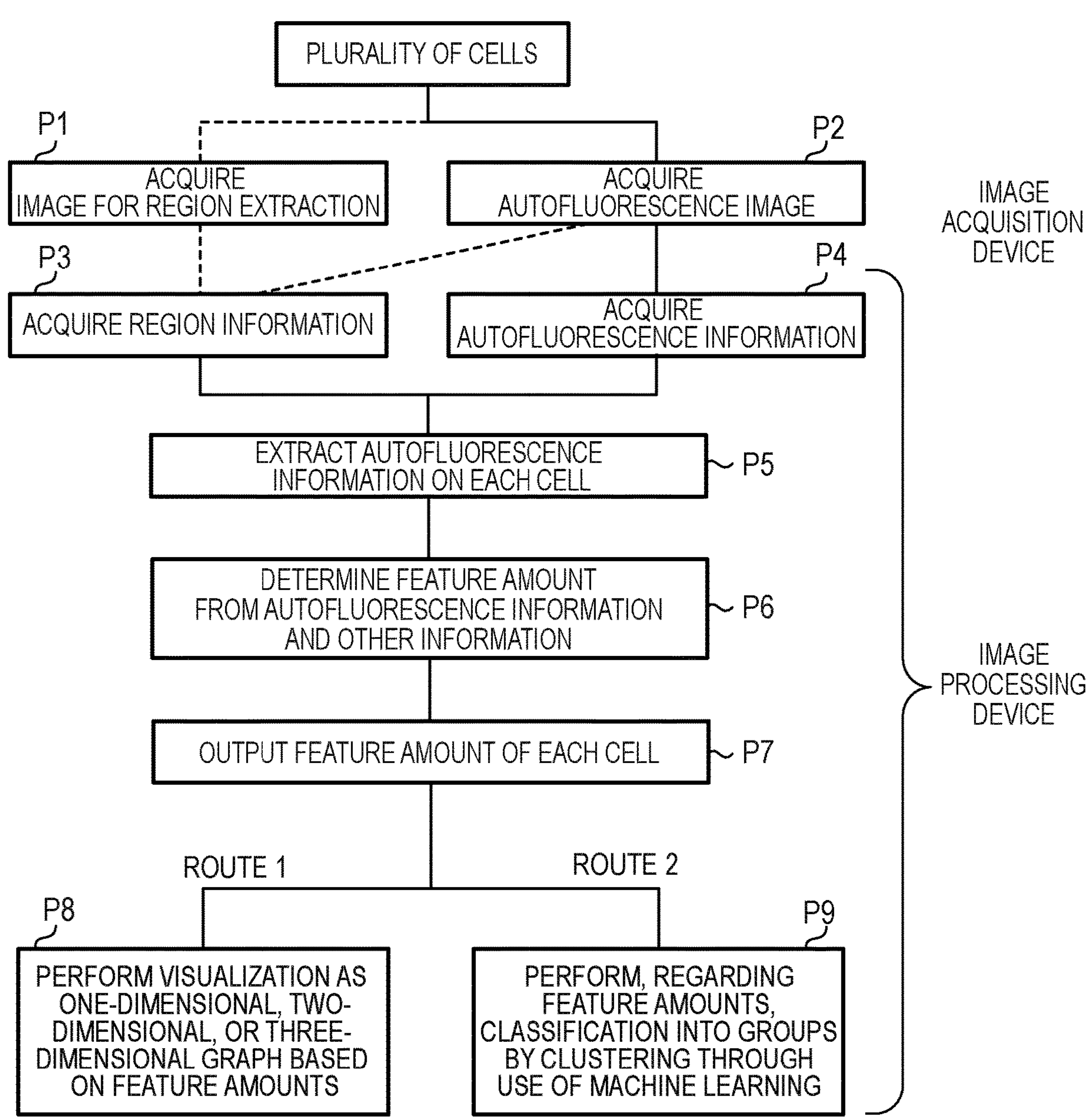
FIG. 4 is a flow chart for illustrating an example of a scheme for the analysis apparatus according to this embodiment.

An example of steps to be performed in the image acquisition device 1A and the image processing device 2A is illustrated in FIG. 4.

In Step P1, the image acquisition device acquires an image for region extraction (this step may be omitted). In Step P2, the image acquisition device acquires an autofluorescence image. Any one of the Step P1 or Step P2 may precede the other, and a precedence relationship therebetween is not limited.

Through the communication I/F 24, the image for region extraction and the autofluorescence image from the image acquisition device 1A are input to the image processing device.

In Step P3, the image processing device 2A acquires region information through use of the image for region extraction or the autofluorescence image. For example, a region is extracted from the image for region extraction, and labeling processing is performed to acquire information to which a label is given to each cell. When the region information is acquired through use of the autofluorescence image, the acquisition of an image for region extraction in Step P1 is not required.

In Step P4, the autofluorescence image is used to acquire autofluorescence information. For example, the autofluorescence image is separated for each of RGB components.

Any one of Step P3 or Step P4 may precede the other, and a precedence relationship therebetween is not limited.

In Step P5, autofluorescence information on each cell is extracted, and subsequently in Step P6, a feature amount is determined from the autofluorescence information and other information. In Step P7, the feature amount of each cell is output. Output results thereof can be displayed on the display unit 23 of the image processing device 2A.

For the subsequent steps, there are two routes. Of the following two routes, a more appropriate one or both thereof can be called up for use depending on a purpose of analysis, the used image, the obtained feature amount, or the like.

A route 1 is described. In Step P8, an appropriate feature amount is selected as an axis for the feature amounts output in Step P7, and the feature amounts are visualized as a one-dimensional, two-dimensional, or three-dimensional graph with each cell being regarded as one point. After that, from the obtained graph, the cells are classified into a plurality of groups through visual observation. Those can be further associated with the phenotypes of the cells, and results thereof can be further displayed on the display unit 23.

A route 2 is described. In Step P9, appropriate ones of the feature amounts output in Step P7 are selected, and are subjected to clustering processing through use of unsupervised machine learning to classify the cells. Those can be further associated with the phenotypes of the cells, and results thereof can be further displayed on the display unit 23.

EXAMPLE

Now, the present invention is described in further detail by way of Examples, but the present invention is not limited to the Examples to be described below.

<Separation of Cells of Single Type by Grade of Malignancy of Cancer>

(Culture of Cells)

Human lung cancer cells SK-LU1 (KAC Co., Ltd.) were cultured in a cell culture medium 104 (KAC Co., Ltd.). A 35-mm glass bottom dish (IWAKI) was used as the cell culture vessel.

(Autofluorescent Image Observation)

The image acquisition device 1A was used. A cell culture solution was replaced by phosphate buffer saline (hereinafter referred to as "PBS," Thermo Fisher Scientific Inc.). A light source of a 365-nm LED (manufactured by OPTOCODE CORPORATION) was used to perform irradiation and excitation through a 400-nm short-pass filter, and an autofluorescence image picked up through a 430-nm long-pass filter was acquired. Further, a light source of a 450-nm LED (manufactured by OPTOCODE CORPORATION) was used to perform irradiation and excitation through a 470-nm short-pass filter, and an autofluorescence image was picked up through a 530-nm long-pass filter.

(Immunostaining)

Immediately after the culture solution of the cultured cells was removed, immobilization was performed through use of a 4% paraformaldehyde aqueous solution (FUJIFILM Wako Pure Chemical Corporation), followed by washing with tris buffer saline (hereinafter referred to as "TBS," Thermo Fisher Scientific Inc.) three times. Membrane permeabilization was performed by treating with Triton-X 100 (0.1%) for three minutes, followed by washing with TBS. After the blocking treatment was performed through use of Blocking One (NACALAI TESQUE, INC.), vimentin being a tumor malignancy marker was labeled with anti-vimentin rabbit IgG (Abcam plc). After the washing with TBS, nuclei and vimentin were visualized with a Hoechst dye (Dojindo Laboratories) being used for the nuclei and Alexa-fluor 555 anti-rabbit IgG (Abcam plc) being used for vimentin.

(Stained Image Observation)

For the nuclei, the light source of the 365-nm LED (manufactured by OPTOCODE CORPORATION) was used to perform irradiation and excitation through the 400-nm short-pass filter, and a fluorescence image of the nuclei picked up through a 430-nm-to-490-nm band-pass filter was obtained. For the vimentin, the light source of the 450-nm LED (manufactured by OPTOCODE CORPORATION) was used to perform irradiation and excitation through the 470-nm short-pass filter, and a vimentin-stained image picked up through a 530-nm-to-550-nm band-pass filter was acquired.

(Extraction of Autofluorescence Information on Cells)

The areas of nuclear regions were acquired, and labeling was performed. Each autofluorescence image was merged with a nuclear image, and an autofluorescence component in a nuclear region was acquired for each individual cell. The RGB components of each autofluorescence image were each separated, and an R component, a G component, and a B component of the autofluorescence in the nuclear region were acquired for each individual cell. Detailed data (e.g., nucleus area and minimum value, maximum value, average value, and median value in the nucleus area) on each of those components was output for each labeled cell.

(Plotting of Autofluorescence Brightness Information)

The brightness information on the respective cells acquired from the autofluorescence images was used to be plotted in units of cells with the following vertical axis and horizontal axis.

Horizontal axis: the average value of B-component brightness values of the autofluorescence image for 350-nm excitation/430-nm long-pass filter observation Vertical axis: the average value of the G components for 450-nm excitation/530-nm long-pass filter observation (Extraction, Subtype Separation, and Plotting of Brightness Information on Vimentin-Stained Image)

The method according to the embodiment of the present invention was applied not only to an autofluorescence image but also to a stained image in the same manner as in a case of performing the method on the autofluorescence image. That is, the brightness values of the individual cells in the stained image were recorded, and the areas of the nuclear regions were acquired through image processing. Color information on the nuclear regions was acquired for each individual cell from the vimentin-stained image. In the same manner as in the extraction of the brightness information on the autofluorescence image, position data on each cell and the detailed data (nucleus area and minimum value, maximum value, average value, and median value in the nucleus area) on each cell were recorded so as to achieve a match. After that, positive or negative was determined based on a vimentin brightness value.

The plotting was performed with the horizontal axis representing the average value of the B-component brightness values of the autofluorescence image for the 350-nm excitation/430-nm long-pass filter observation and the vertical axis representing the average value of the G components of the autofluorescence image for the 450-nm excitation/530-nm long-pass filter observation.

(Unsupervised Learning)

Attempts were made to classify cells into clusters through machine learning (k-means method) with the brightness of each cell being used as an explanatory variable.

Each experiment is described below. Preparation of each reagent and the like are as described above.

(Plotting of Brightness Values of Autofluorescence of SK-LU1 Cells)

Figure 5A:
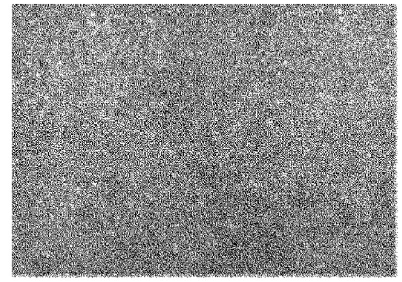
FIG. 5A shows an autofluorescence image picked up by a camera equipped with an RGB color sensor.
Figure 5B:
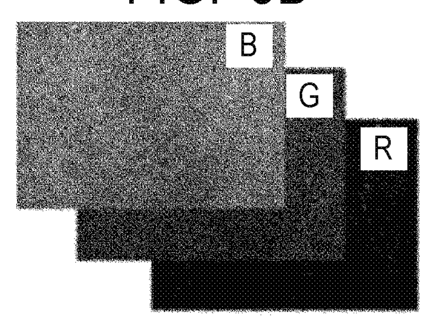
FIG. 5B shows an image obtained by decomposing the autofluorescence image into 16-bit grayscale images by RGB.

SK-LU1 cells (KAC Co., Ltd.) were cultured in a 35-mm glass bottom dish (manufactured by IWAKI & CO., LTD.). An autofluorescence image of the SK-LU1 cells on the dish was picked up through use of the image acquisition device. Examples of results thereof are shown in FIGS. 5A and 5B. FIG. 5A shows an image picked up, after irradiation with excitation light, by a camera equipped with an RGB color sensor through a long-pass filter selected so as to prevent the excitation light from entering the imaging unit, and FIG. 5B shows images obtained by decomposing the image picked up for the analysis into 16-bit grayscale images by RGB. In this Example, the images obtained through the decomposition by RGB were each used as the autofluorescence image.

Subsequently, vimentin and nuclei of the SK-LU1 cells on the dish which have been subjected to the image pickup were stained through immunostaining, and stained images on the dish were picked up in the same manner through use of an image photographing apparatus. The vimentin is a molecular marker that is expressed when epithelial-to-mesenchymal transition of cancer cells occurs.

Figure 6A:
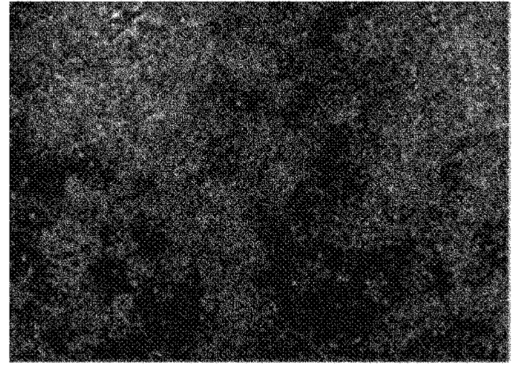
FIG. 6A is a nuclear staining image of SK-LU1 cells.
Figure 6B:
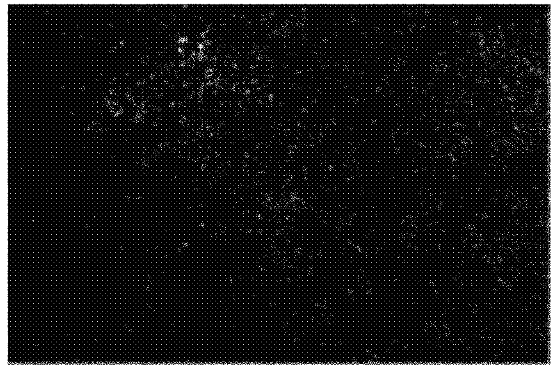
FIG. 6B shows SK-LU1 cells immunostained specifically for vimentin.

Examples of results thereof are shown in FIGS. 6A and 6B. FIG. 6A shows an image obtained through nuclear staining, and FIG. 6B shows an image obtained by staining the vimentin through the immunostaining. In this Example, the image obtained through the nuclear staining was used as the image for region extraction.

The autofluorescence brightness of each cell was acquired from the nuclear region of each cell by wavelengths for excitation and observation and by RGB through use of the autofluorescence images and the image for region extraction. That is, the image for region extraction was binarized, and cell position information estimated from the nuclei was used as an image mask, and respective pieces of RGB color information on the autofluorescence of each individual cell were extracted by superimposing the image mask on the autofluorescence images.

An average of the autofluorescence brightness in the nuclear region of each individual cell was set as average brightness of each cell.

In this Example, two kinds of autofluorescence brightness were adopted as the autofluorescence information on each cell. That is, the average brightness of the B components of a 365-nm excitation/430-nm long-pass filter observation autofluorescence image and the average brightness of the G components of a 450-nm excitation/530-nm long-pass filter observation autofluorescence image were used as the autofluorescence brightness values.

The respective cells were scatter-plotted on the following vertical axis and horizontal axis.

Figure 7:
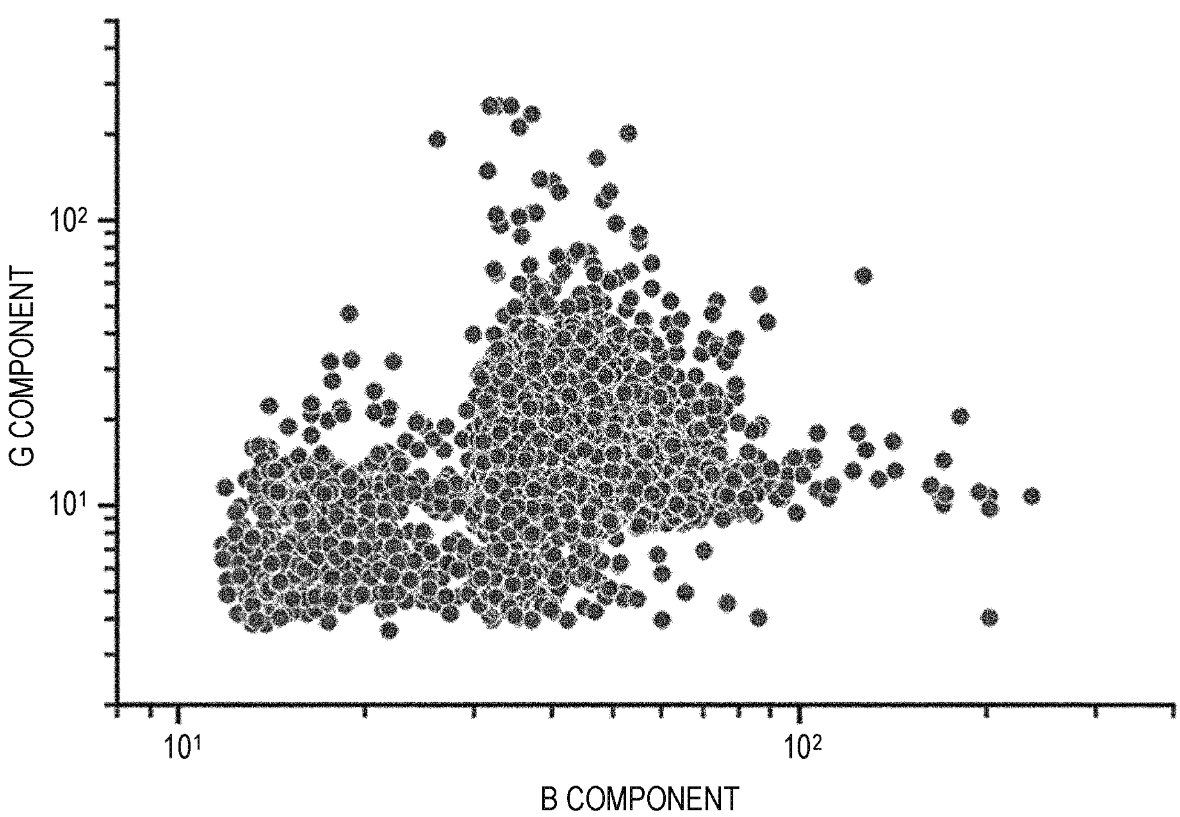
FIG. 7 is a graph obtained by plotting cultured sk-lu1 cells in units of cells with the horizontal axis representing the value of a B component of a 365-nm excitation/430-nm long-pass filter observation autofluorescence image and the vertical axis representing the value of a G component of a 450-nm excitation/530-nm long-pass filter observation autofluorescence image.

Vertical axis: the average value of the G components of the 450-nm excitation/530-nm long-pass filter observation autofluorescence image in each cell Horizontal axis: the average value of the B components of the 365-nm excitation/430-nm long-pass filter observation autofluorescence image in each cell Results thereof are shown in FIG. 7. A logarithmic plot was used in order to facilitate visualization.

Each point in the graph represents the average brightness value of each cell.

(Clustering of Plotted Points of Brightness Values of Autofluorescence of SK-LU1 Cells Through Visual Observation (FIG. 8))

Figure 8:
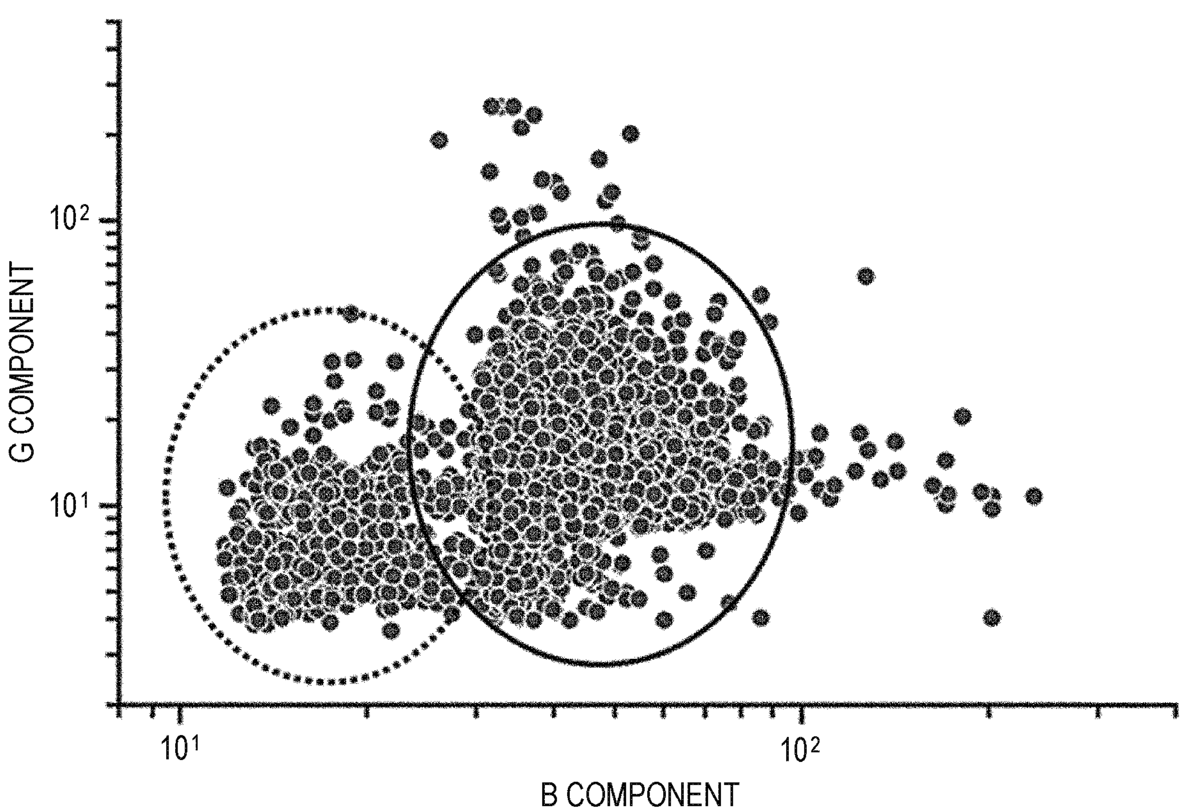
FIG. 8 is a graph for showing that the plotted points of FIG. 7 can be classified into at least two clusters (solid line and dotted line).

The plotted points shown in FIG. 7 presented a possibility of being able to be separated into at least two clusters (dotted line and solid line) as shown in FIG. 8 through visual observation. The autofluorescence emitted by the cells is considered to be mainly ascribable to the fluorescence of coenzymes (NADH and FAD) involved in metabolism. A ratio among respective activated coenzymes varies depending on differences in metabolic pathways of individual cells. When there are coenzymes that emit fluorescence among the activated coenzymes, fluorescence wavelengths of the respective coenzymes are different, and hence it is conceivable that a difference in color tone of autofluorescence occurs in cells having different metabolic pathways, thereby enabling the cells to be classified by a non-invasive method as in this embodiment.

(Separation of Subtypes by Vimentin Brightness Values of Sk-Lu1 Cells)

The cells were classified into two subtypes, i.e., positive and negative for vimentin, from the vimentin-stained image of FIG. 6B photographed as described above and vimentin brightness value data on each individual cell acquired therefrom. The scatter plotting was performed for each of those two subtypes represented by different shapes through use of the following as the vertical axis and the horizontal axis.

Figure 9:
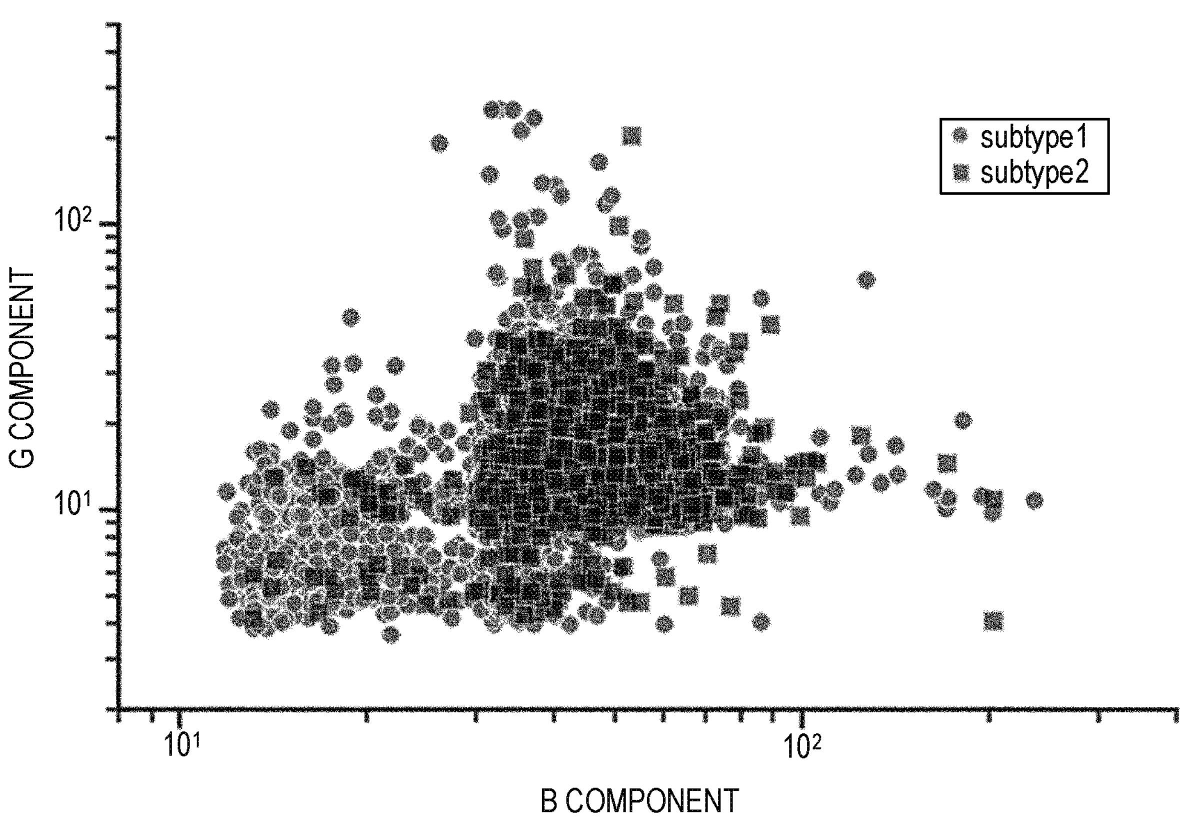
FIG. 9 is a graph for showing a result of performing classification into two subtypes, i.e., positive and negative for vimentin, by providing a threshold value for staining results of vimentin.

Vertical axis: the average value of the G components of the 450-nm excitation/530-nm long-pass filter observation autofluorescence image in each cell Horizontal axis: the average value of the B components of the 365-nm excitation/430-nm long-pass filter observation autofluorescence image in each cell Results thereof are shown in FIG. 9. Each point indicated by the black square as subtype2 in FIG. 9 is a vimentin-positive cell, and each point indicated by a black circle as subtype1 is a vimentin-negative cell.

(Merge of FIG. 8 and FIG. 9)

Figure 10:
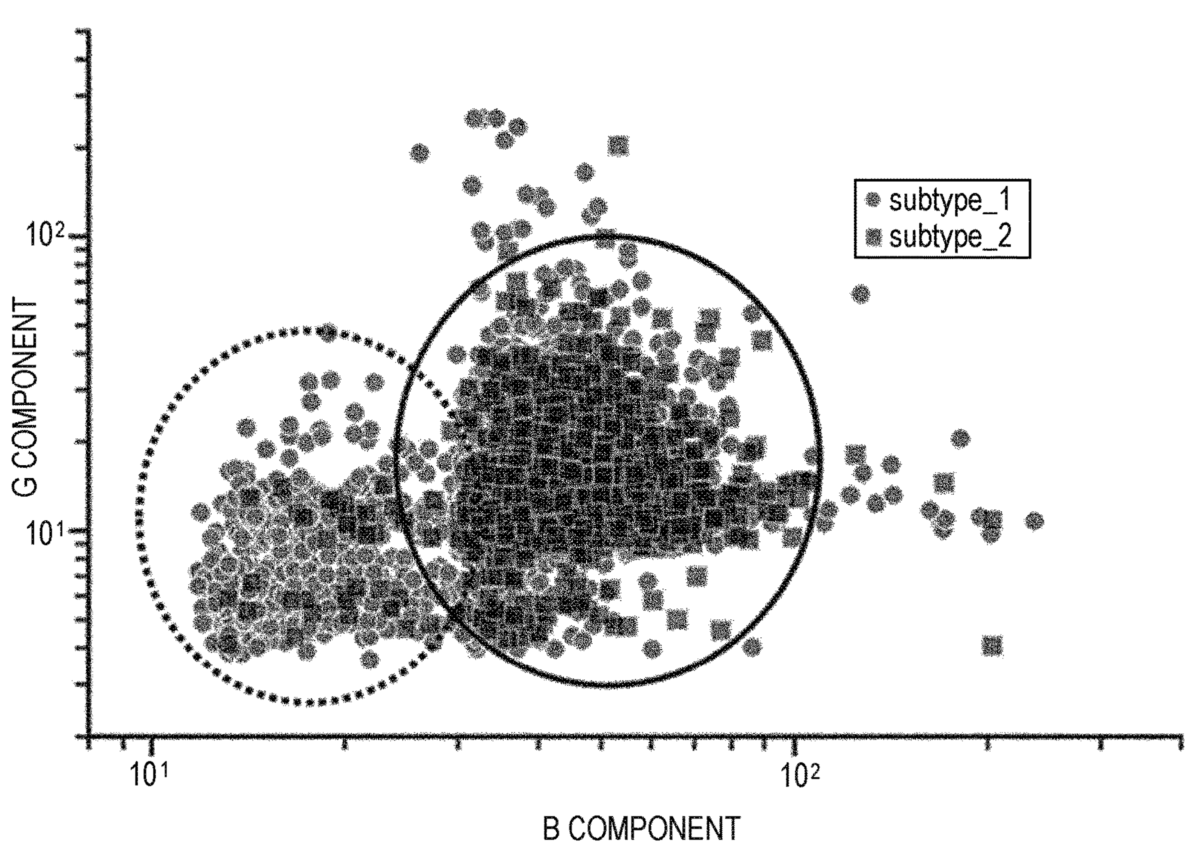
FIG. 10 is a graph for showing a result of merging the graph of FIG. 8 and the graph of FIG. 9.

The merged results of FIG. 8 and FIG. 9 are shown in FIG. 10. The two clusters of FIG. 8 overlap with the main positions of the two subtypes plotted in FIG. 9 based on the determination of the positive or negative for vimentin. In FIG. 10, a large number of vimentin-positive subtype cells were included in a cluster surrounded by the solid line. In contrast, in FIG. 10, few vimentin-positive subtype cells were included in a cluster surrounded by the dotted line. That is, it was shown that the results of classifying the cell phenotypes based on the autofluorescence images highly correlated with the positive and negative for vimentin. Hitherto, it has not been possible to obtain information on the positive or negative for vimentin without specific staining. That is, it was shown that, with the method according to this embodiment, the classification was successfully performed to the same degree as that of the positive and negative for vimentin through use of the autofluorescence without staining. Further, the vimentin is a molecular marker that is expressed when epithelial-to-mesenchymal transition of cancer cells occurs, and can be one of indices of the tumor malignancy marker. That is, it was shown that, with the method according to this embodiment, when cell types having a plurality of different metabolic pathways such as those of "cells having different grades of malignancy of cancer" were present within one field of view, the cells were successfully classified by presence or absence of tumor malignancy or by presence or absence of epithelial-to-mesenchymal transition through use of the autofluorescence without staining.

(Clustering Through Machine Learning Using Autofluorescence Intensity as Explanatory Variable)

From the autofluorescence images photographed as described above, two values, i.e., a minimum value of the B-component brightness values of the 365-nm excitation/430-nm long-pass filter observation and a minimum value of the G-component brightness values of the 450-nm excitation/530-nm long-pass filter observation were acquired as explanatory variables. Those explanatory variables were used to separate the cells into two clusters by unsupervised machine learning. The scatter plotting was performed for each of the two clusters represented by black squares and black circles through use of the following as the vertical axis and the horizontal axis.

Figure 11:
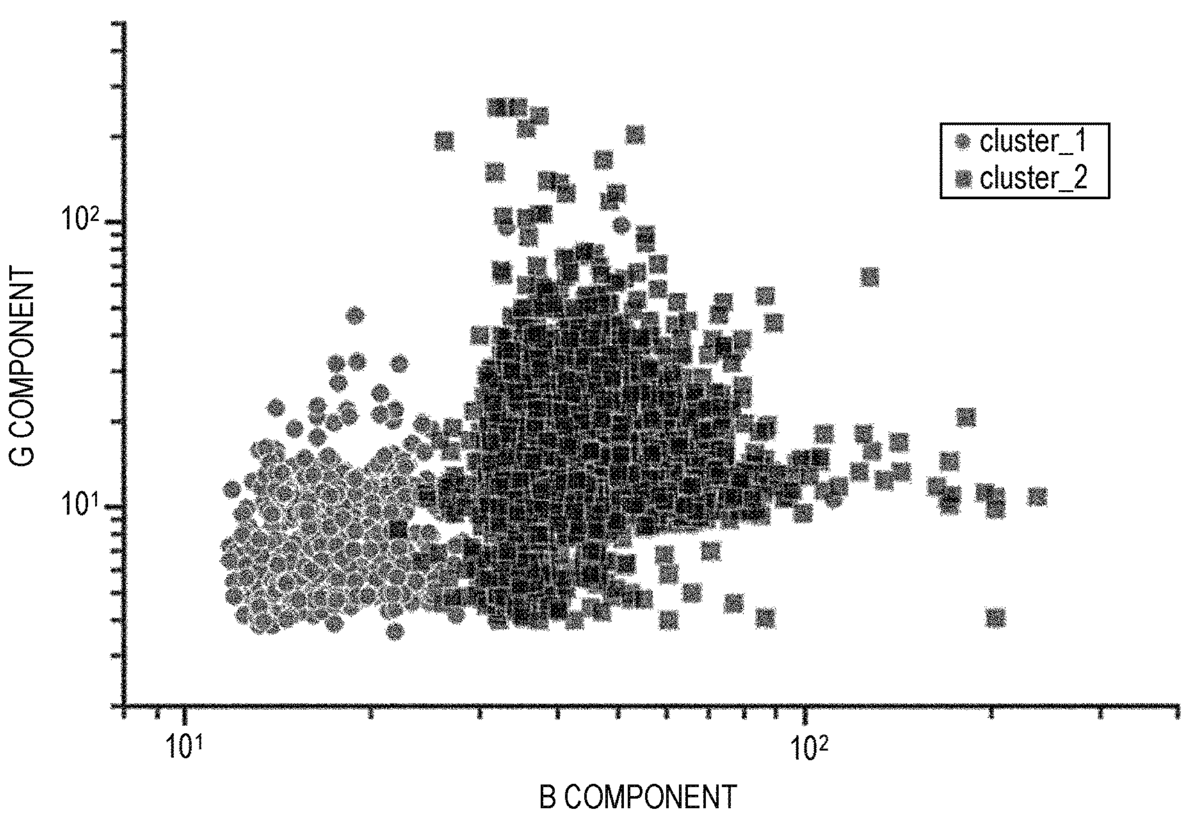
FIG. 11 shows a result of classifying the cultured sk-lu1 cells by unsupervised learning (k-means method).

Horizontal axis: the average value of the B components of the 365-nm excitation/430-nm long-pass filter observation autofluorescence image in each cell Vertical axis: the average value of the G components of the 450-nm excitation/530-nm long-pass filter observation autofluorescence image in each cell Results thereof are shown in FIG. 11.

Through comparison between results thereof and FIG. 9, it was shown that the positions of the two subtypes determined based on the positive and negative for vimentin and the positions of the two clusters separated by the machine learning roughly matched. That is, it was shown that, even when the machine learning was used, with the method according to this embodiment, the cells were successfully classified to the same degree as that of the positive and negative for vimentin through use of the autofluorescence without staining. It was also shown that, when the machine learning was used, the cells were successfully classified by the presence or absence of tumor malignancy or by the presence or absence of epithelial-to-mesenchymal transition through use of the autofluorescence without staining.

<Separation of Two Types of Cancer Cells by Cell Types>

First, each procedure is described.

(Culture of Cells)

Human lung cancer cells PC-9 (KAC Co., Ltd.) and human lung cancer cells NCI-H322 (KAC Co., Ltd.) were mixed and cultured in a cell culture medium 103 (KAC Co., Ltd.). A 35-mm glass bottom dish (IWAKI) was used as a cell culture vessel.

(Autofluorescence Image Observation)

The image acquisition device 1A was used. A cell culture solution was replaced by phosphate buffer saline (hereinafter referred to as "PBS," Thermo Fisher Scientific Inc.). The light source of the 365-nm LED (manufactured by OPTOCODE CORPORATION) was used to perform irradiation and excitation through the 400-nm short-pass filter, and an autofluorescence image picked up through the 430-nm long-pass filter was acquired. Further, the light source of the 450-nm LED (manufactured by OPTOCODE CORPORATION) was used to perform irradiation and excitation through the 470-nm short-pass filter, and an autofluorescence image was picked up through the 530-nm long-pass filter.

(Mitochondria Staining and Nuclear Staining)

For each cultured cells, a mitochondria was stained with a MitoPT (trademark)-TMRE assay kit (ImmunoChemistry Technologies), and a nucleus was stained with a Hoechst colorant (Dojindo Laboratories) to visualize the membrane potential difference of the nucleus and the mitochondria.

(Stained Image Observation)

For the nuclei, the light source of the 365-nm LED (manufactured by OPTOCODE CORPORATION) was used to perform irradiation and excitation through the 400-nm short-pass filter, and a fluorescence image of the nuclei picked up through a 430-nm-to-490-nm band-pass filter was obtained. For the mitochondrial membrane potential difference, a light source of a 530-nm LED (manufactured by OPTOCODE CORPORATION) was used to perform irradiation and excitation through a 550-nm short-pass filter, and a mitochondria-stained image picked up through a 570-nm-to-630-nm band-pass filter was acquired.

(Extraction of Autofluorescence Information on Cells)

The areas of nuclear regions were acquired, and labeling was performed. Each autofluorescence image was merged with a nuclear image, and an autofluorescence component in a nuclear region was acquired for each individual cell. The RGB components of each autofluorescence image were each separated, and an R component, a G component, and a B component of the autofluorescence in the nuclear region were acquired for each individual cell. In addition, the RGB color space of the autofluorescence was converted into the HLS color space, the HSV color space, and the Lab color space, and the respective components were acquired for each color space. Detailed data (e.g., nucleus area and minimum value, maximum value, average value, and median value in the nucleus area) on each of those components was output for each labeled cell.

(Plotting of Autofluorescence Brightness Information)

Figure 12:
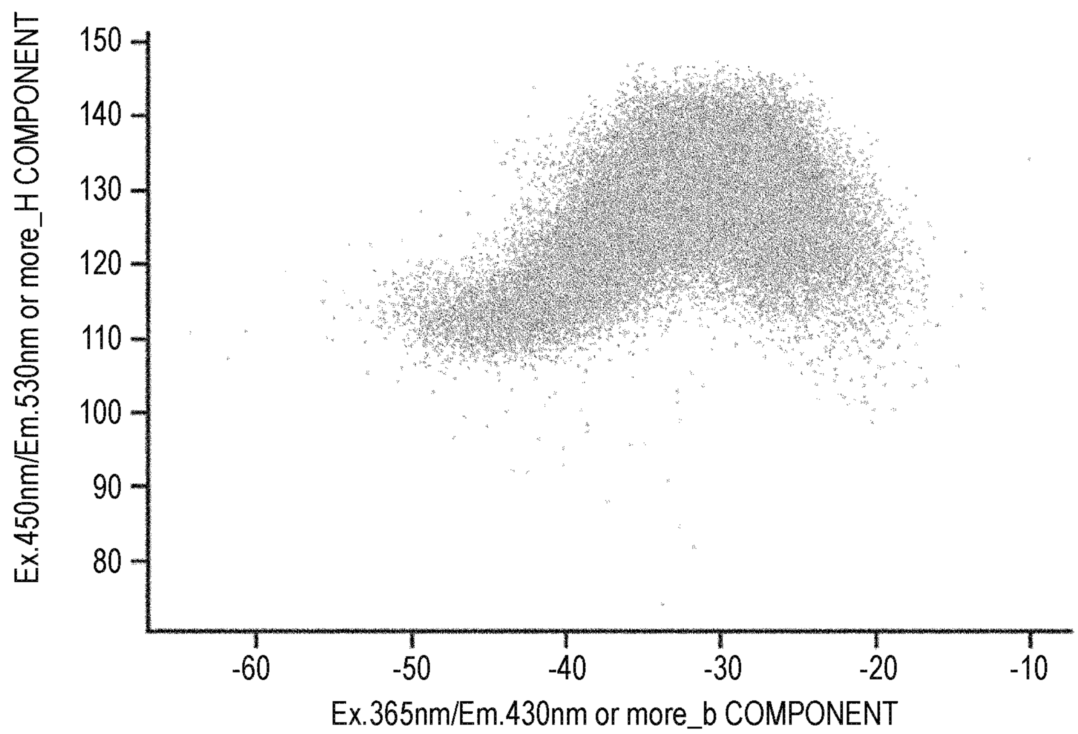
FIG. 12 is a graph obtained by plotting mixed-cultured PC-9 cells and NCI-H322 cells in units of cells with the horizontal axis representing the value of the "b" component in a Lab color space of the 365-nm excitation/430-nm long-pass filter observation autofluorescence image and the vertical axis representing the value of an H component in an HSV color space of the 450-nm excitation/530-nm long-pass filter observation autofluorescence image.

The brightness information on the respective cells acquired from the autofluorescence images was used to be plotted in units of cells with the following vertical axis and horizontal axis (FIG. 12).

Horizontal axis: the average value of “b” components in the Lab color space of the 365-nm excitation/430-nm long-pass filter observation autofluorescence image in each cell Vertical axis: the average value of H components in the HSV color space of the 450-nm excitation/530-nm long-pass filter observation autofluorescence image in each cell (Plotting of Autofluorescence Brightness Information for Each Cell Type)

Figure 13:
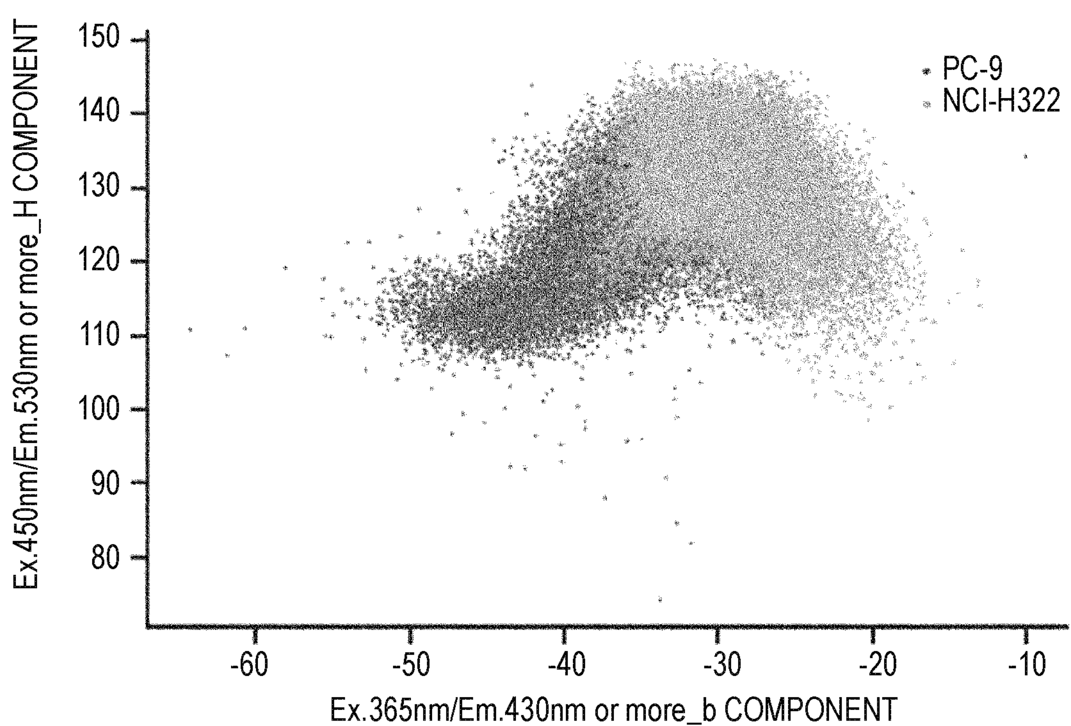
FIG. 13 is a graph obtained by plotting the plotted points of FIG. 12 in different colors through use of ground truth labels of the PC-9 cell and the NCI-H322 cell.

In regard to the brightness information on each cell acquired from the autofluorescence images, each cell is labeled as to whether the cell is PC-9 or NCI-H322. Such labels were used to perform plotting on the following vertical axis and horizontal axis in different colors depending on the cell type (FIG. 13).

Horizontal axis: the average value of “b” components in the Lab color space of the 365-nm excitation/430-nm long-pass filter observation autofluorescence image in each cell Vertical axis: the average value of H components in the HSV color space of the 450-nm excitation/530-nm long-pass filter observation autofluorescence image in each cell (Extraction and Plotting of Brightness Information on Mitochondria-Stained Image)

Figure 14:
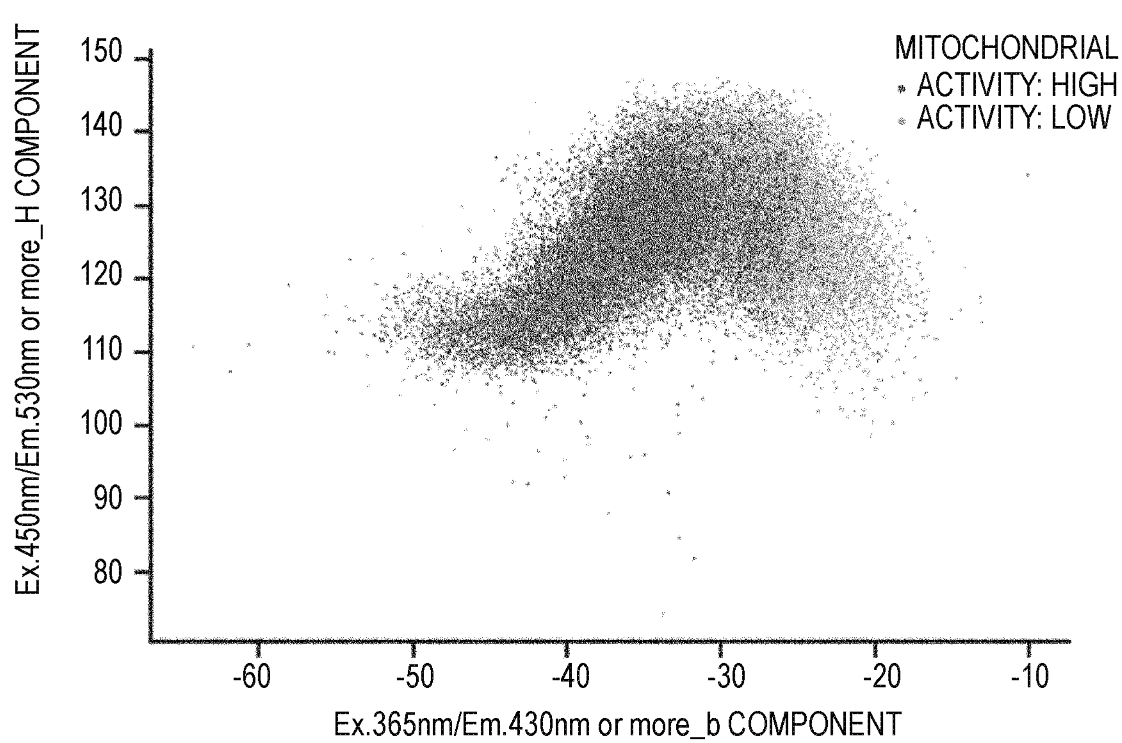
FIG. 14 is a graph obtained by plotting the plotted points of FIG. 12 in different colors after separating mitochondrial staining results into two areas, i.e., an area exhibiting high mitochondrial activity and an area exhibiting low mitochondrial activity.

The method according to the embodiment of the present invention was applied not only to an autofluorescence image but also to a stained image in the same manner as in the case of performing the method on the autofluorescence image. That is, the brightness values of the individual cells in the stained image were recorded, and the areas of the nuclear regions were acquired through image processing. The color information on the nuclear regions was acquired for each individual cell from the mitochondria-stained image. In the same manner as in the extraction of the brightness information on the autofluorescence image, the position data on each cell and the detailed data (nucleus area and minimum value, maximum value, average value, and median value in the nucleus area) on each cell were recorded so as to achieve a match. After that, a magnitude of mitochondrial activity was determined based on a mitochondria brightness value, and an area exhibiting high mitochondrial activity and an area exhibiting low mitochondrial activity were plotted on the following vertical axis and horizontal axis through use of different colors (FIG. 14).

Horizontal axis: the average value of “b” components in the Lab color space of the 365-nm excitation/430-nm long-pass filter observation autofluorescence image in each cell Vertical axis: the average value of H components in the HSV color space of the 450-nm excitation/530-nm long-pass filter observation autofluorescence image in each cell (Unsupervised Learning)

Figure 15:
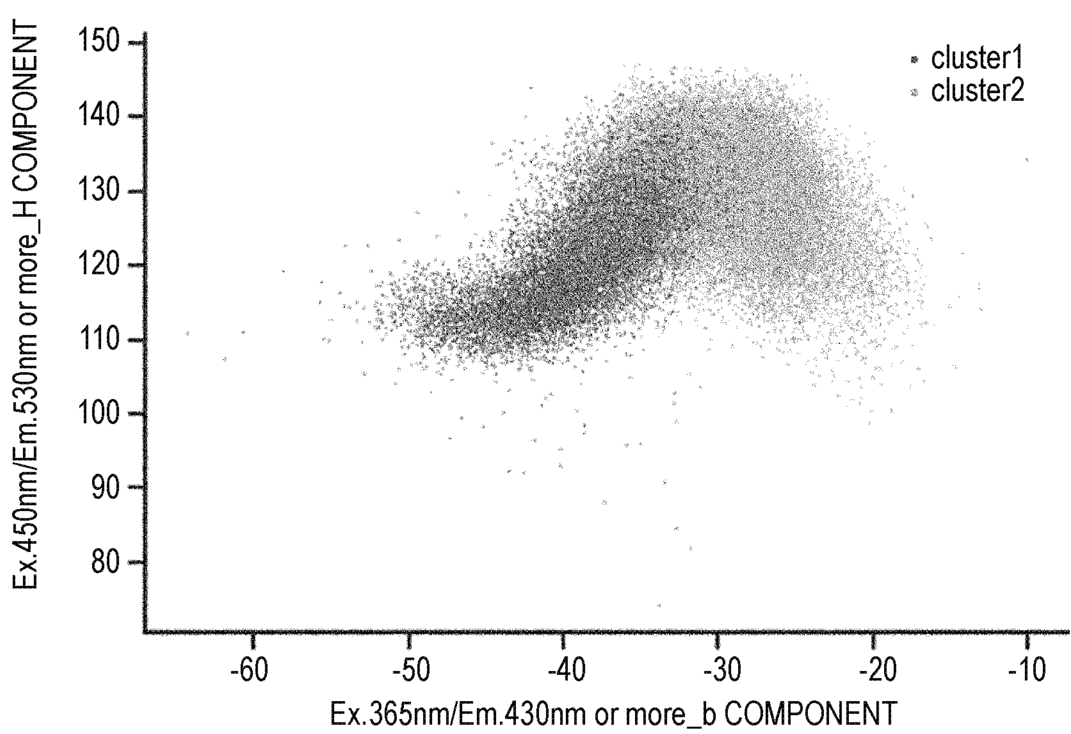
FIG. 15 shows a result of classifying the mixed-cultured PC-9 cells and NCI-H322 cells by the unsupervised learning (k-means method).

Attempts were made to classify cells into clusters through the machine learning (k-means method) with part of the brightness of each cell being used as an explanatory variable (FIG. 15).

Each experiment is described below. Preparation of each reagent and the like are as described above.

(Autofluorescence Image Pickup of PC-9 Cells and NCI-H322 Cells and Pickup of Mitochondria-Stained Image)

PC-9 cells (KAC Co., Ltd.) and NCI-H322 cells (KAC Co., Ltd.) were mixed and cultured in a 35-mm glass bottom dish (manufactured by IWAKI). An autofluorescence image of the cells on the dish was picked up through use of the image acquisition device. Specifically, the image was picked up, after irradiation with excitation light, by the camera equipped with the RGB color sensor through the long-pass filter selected so as to prevent the excitation light from entering the imaging unit. In this Example, the images obtained by decomposing the picked-up image by RGB were each used as the autofluorescence image.

Subsequently, mitochondria and nuclei of the cells on the dish which have been subjected to the image pickup were stained, and stained images on the dish were picked up in the same manner through use of the image photographing apparatus. A mitochondrial staining reagent is stained in accordance with a mitochondrial membrane potential to reflect the metabolic state in the mitochondria. As the mitochondria are in a more active metabolic state, the staining becomes stronger.

In this Example, the image obtained through the nuclear staining was used as the image for region extraction.

(Plotting of Brightness Values of Autofluorescence)

The autofluorescence brightness of each cell was acquired from the nuclear region of each cell by wavelengths for excitation and observation and by RGB through use of the autofluorescence images and the image for region extraction. That is, the image for region extraction was binarized, and the cell position information estimated from the nuclei was used as the image mask, and respective pieces of RGB color information on the autofluorescence of each individual cell were extracted by superimposing the image mask on the autofluorescence images. Subsequently, color space conversion was performed on the respective pieces of RGB color information on the autofluorescence to acquire autofluorescence brightness in the HSV color space, the HLS color space, and the Lab color space in addition to the RGB color space. The average of the autofluorescence brightness in the nuclear region of each individual cell was set as the autofluorescence brightness of each cell.

In this Example, 12 kinds of autofluorescence brightness were adopted as the autofluorescence information on each cell. That is, particularly in this embodiment, values of average brightness of the B components (RGB color space), the G components (RGB color space), H components (HSV color space), S components (HSV color space), “a” components (Lab color space), and the “b” components (Lab color space) of the 365-nm excitation/430-nm long-pass filter observation autofluorescence image and values of average brightness of the G components (RGB color space), the R components (RGB color space), the H components (HSV color space), the S component (HSV color space), the "a" component (Lab color space), and the "b" components (Lab color space) of the 450-nm excitation/530-nm long-pass filter observation autofluorescence image were used as the autofluorescence brightness values.

The respective cells were scatter-plotted on, for example, the following vertical axis and horizontal axis.

Vertical axis: the average value of "b" components in the Lab color space of the 365-nm excitation/430-nm long-pass filter observation autofluorescence image in each cell Horizontal axis: the average value of H components in the HSV color space of the 450-nm excitation/530-nm long-pass filter observation autofluorescence image in each cell Results thereof are shown in FIG. 12.

Each point in the graph represents the average brightness value of each cell.

(Plotting of Cells for Each Ground Truth Label)

In each picked-up autofluorescence image, the autofluorescence information had been acquired together with labels of the PC-9 cell and the NCI-H322 cell. The scatter plotting was performed for each of those two cell types represented by different colors through use of the following as the vertical axis and the horizontal axis.

Vertical axis: the average value of "b" components in the Lab color space of the 365-nm excitation/430-nm long-pass filter observation autofluorescence image in each cell Horizontal axis: the average value of H components in the HSV color space of the 450-nm excitation/530-nm long-pass filter observation autofluorescence image in each cell Results thereof are shown in FIG. 13. Each point indicated by dark gray in FIG. 13 is a PC-9 cell, and each point indicated by light gray is an NCI-H322 cell. As shown in FIG. 13, it is indicated that the PC-9 cells and the NCI-H322 cells have different tendencies of autofluorescence.

As described above, the autofluorescence emitted by the cells is considered to be ascribable to, as a main factor, the fluorescence of the coenzymes (NADH and FAD) involved in the metabolism. The ratio among respective activated coenzymes varies depending on differences in metabolic pathways of individual cells. When there are coenzymes that emit fluorescence among the activated coenzymes, fluorescence wavelengths of the respective coenzymes are different, and hence a difference in color tone of autofluorescence occurs in cells having different metabolic pathways. In this embodiment, two cell types having different metabolic pathways were caused to coexist mixed within one field of view, and hence those kinds of autofluorescence are considered to have been output as plotted points having different tendencies.

(Extraction and Plotting of Brightness Information on Mitochondria-Stained Image)

The cells were divided into two areas, i.e., an area exhibiting strong mitochondrial activity and an area exhibiting weak mitochondrial activity from the mitochondria-stained image photographed as described above and mitochondria-stained brightness value data on each individual cell acquired therefrom. The scatter plotting was performed for each of those two areas represented by different colors through use of the following as the vertical axis and the horizontal axis.

Vertical axis: the average value of "b" components in the Lab color space of the 365-nm excitation/430-nm long-pass filter observation autofluorescence image in each cell Horizontal axis: the average value of H components in the HSV color space of the 450-nm excitation/530-nm long-pass filter observation autofluorescence image in each cell Results thereof are shown in FIG. 14. Each point indicated by dark gray in FIG. 14 is a cell exhibiting relatively high mitochondrial activity, while each point indicated by light gray is a cell exhibiting relatively low mitochondrial activity.

As compared to FIG. 13, more PC-9 cells are included in the area exhibiting high mitochondrial activity, while more NCI-H322 cells are included in the area exhibiting low mitochondrial activity.

That is, it was shown that an activity state of mitochondria differed depending on the cell type, and as a result, the results of classifying the cell phenotypes based on the autofluorescence images highly correlated with the mitochondrial activity.

(Clustering Through Machine Learning Using Autofluorescence Intensity as Explanatory Variable)

From the autofluorescence images photographed as described above, a total of 12 values of average brightness, i.e., the values of average brightness of the B components (RGB color space), the G components (RGB color space), the H components (HSV color space), the S components (HSV color space), the "a" components (Lab color space), and the "b" components (Lab color space) of the 365-nm excitation/430-nm long-pass filter observation autofluorescence image and the values of average brightness of the G components (RGB color space), the R components (RGB color space), the H components (HSV color space), the S component (HSV color space), the "a" component (Lab color space), and the "b" components (Lab color space) of the 450-nm excitation/530-nm long-pass filter observation autofluorescence image were acquired as the explanatory variables. Those explanatory variables were used to separate the cells into two clusters by the unsupervised machine learning (k-means method). The scatter plotting was performed for each of the two clusters represented by dark gray and light gray through use of the following as the vertical axis and the horizontal axis.

Vertical axis: the average value of "b" components in the Lab color space of the 365-nm excitation/430-nm long-pass filter observation autofluorescence image in each cell Horizontal axis: the average value of H components in the HSV color space of the 450-nm excitation/530-nm long-pass filter observation autofluorescence image in each cell Results thereof are shown in FIG. 15.

When the plot shown in FIG. 13 and the plot shown in FIG. 15 are compared, the respective clusters separated by the unsupervised machine learning using the autofluorescence and the respective clusters of the PC-9 cells and the NCI-H322 cells based on ground truth labels roughly match. Further, the accuracy with the unsupervised machine learning was 72%.

As described above, through the cluster separation performed by the unsupervised machine learning, two kinds of cell types were successfully classified with a certain degree of accuracy. Further, hitherto, it has not been possible to obtain information on the magnitude of mitochondrial activity without specific staining. That is, it was shown that, with the method according to this embodiment, the cell types were successfully classified to the same degree as that of mitochondrial staining through use of the autofluorescence through use of the machine learning without staining.

According to the present invention, a plurality of cells can be subjected to cell classification through use of the autofluorescence information on the individual cells. According to the present invention, it is possible to non-invasively classify cells without requiring staining.

The present invention is not limited to the embodiments described above, and various changes and modifications can be made without departing from the spirit and scope of the present invention. The following claims are appended hereto in order to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method comprising the steps of:
- acquiring autofluorescence information regarding a plurality of cells through use of an autofluorescence image regarding the plurality of cells;
- acquiring region information indicating a region of each individual cell in the autofluorescence image;
- extracting the autofluorescence information on the individual cells from the autofluorescence information regarding the plurality of cells and the region information; and
- classifying, using unsupervised machine learning, the plurality of cells into two or more groups by performing clustering through use of the autofluorescence information on the individual cells.

2. The method according to claim 1, wherein the region information is acquired through use of the autofluorescence image regarding the plurality of cells.

3. The method according to claim 1, further comprising a step of acquiring an image for region extraction regarding the plurality of cells,
- wherein the region information is acquired through use of the image for region extraction regarding the plurality of cells.

4. The method according to claim 1, wherein the autofluorescence information includes brightness of autofluorescence.

5. The method according to claim 4, wherein the brightness comprises a value calculated as an index of at least any one of R, G, or B in an RGB color space.

6. The method according to claim 4, wherein the brightness comprises a value calculated as an index in a Lab color space or an HSV color space.

7. The method according to claim 1, wherein the step of classifying includes performing visualization as a one-dimensional graph, a two-dimensional graph, or a three-dimensional graph with at least brightness of autofluorescence of the individual cells being used as one axis.

8. The method according to claim 1, wherein the unsupervised machine learning is selected from the group consisting of principal component analysis, a k-means method, and GMM, and wherein for each selection, at least the autofluorescence information on the individual cells is used as one feature amount.

9. The method according to claim 1, further comprising a step of associating the two or more groups with phenotypes of cells on a group-by-group basis.

10. The method according to claim 9, wherein the phenotypes of cells comprise at least one combination selected from a combination including a cancer cell and a non-cancer cell, a combination including an undifferentiated cell and a differentiated cell, a combination including the differentiated cell and a dedifferentiated cell, and a combination including epithelial and mesenchymal cells of allogeneic cancer cells.

11. The method according to claim 1, wherein the autofluorescence image regarding the plurality of cells is acquired by picking up an image of a region of 60 $mm^2$ or more.

12. The method according to claim 1, wherein the autofluorescence image regarding the plurality of cells has number of pixels of at least 30,000 pixels or more and a resolution of 20 μm or less per pixel.

13. The method according to claim 1, further comprising a step of acquiring quantitative information regarding the groups obtained through the classification by the step of classifying.

14. An analysis apparatus comprising an image acquisition device and an image processing device,
- wherein the image acquisition device is configured to acquire an autofluorescence image regarding a plurality of cells, and
- wherein the image processing device is configured to:
  - acquire autofluorescence information regarding the plurality of cells through use of the autofluorescence image;
  - acquire region information indicating a region of each individual cell in the autofluorescence image;
  - extract the autofluorescence information on the individual cells from the autofluorescence information regarding the plurality of cells and the region information; and
  - classify, using unsupervised machine learning, the plurality of cells into two or more groups by performing clustering through use of the autofluorescence information on the individual cells.

15. The analysis apparatus according to claim 14, wherein the image processing device is configured to acquire the region information through use of the autofluorescence image regarding the plurality of cells.

16. The analysis apparatus according to claim 14,
- wherein the image acquisition device is further configured to acquire an image for region extraction regarding the plurality of cells, and
- wherein the image processing device is configured to acquire the region information through use of the image for region extraction regarding the plurality of cells.

17. The analysis apparatus according to claim 14, wherein the image processing device is configured to perform, at a time of the classification, visualization as a one-dimensional graph, a two-dimensional graph, or a three-dimensional graph with at least brightness of autofluorescence of the individual cells being used as one axis.

18. The analysis apparatus according to claim 14, wherein the unsupervised machine learning is selected from the group consisting of principal component analysis, a k-means method, and GMM, and wherein for each selection, at least the autofluorescence information on the individual cells is used as one feature amount.

19. The analysis apparatus according to claim 14, wherein the image processing device is further configured to associate the two or more groups with phenotypes of cells on a group-by-group basis.

20. The analysis apparatus according to claim 19, wherein the phenotypes of cells comprise at least one combination selected from a combination including a cancer cell and a non-cancer cell, a combination including an undifferentiated cell and a differentiated cell, a combination including the differentiated cell and a dedifferentiated cell, and a combination including epithelial and mesenchymal cells of allogeneic cancer cells.

21. A method comprising:

acquiring autofluorescence information regarding a plurality of cells through use of an autofluorescence image regarding the plurality of cells;

acquiring region information indicating a region of each individual cell in the autofluorescence image;

acquiring an image for region extraction regarding the plurality of cells that is different from the autofluorescence image regarding the plurality of cells, wherein the region information is acquired through use of the image for region extraction regarding the plurality of cells;

extracting the autofluorescence information on the individual cells from the autofluorescence information regarding the plurality of cells and the region information; and classifying the plurality of cells into two or more groups by performing clustering through use of the autofluorescence information on the individual cells.

* * * * *